United States Patent
Anand et al.

(10) Patent No.: US 12,556,764 B2
(45) Date of Patent: Feb. 17, 2026

(54) SYSTEMS, DEVICES, AND METHODS FOR SELECTING TV USER INTERFACE TRANSITIONS

(71) Applicant: Synamedia Limited, Staines Upon Thames (GB)

(72) Inventors: Karthigayan Anand, Bangalore (IN); Anthony Leigh, Workingham (GB); Peter Benjamin Matthews, Basingstoke (GB)

(73) Assignee: Synamedia Limited, Maidenhead (GB)

( * ) Notice: Subject to any disclaimer, the term of this patent is extended or adjusted under 35 U.S.C. 154(b) by 0 days.

(21) Appl. No.: 18/640,275

(22) Filed: Apr. 19, 2024

(65) Prior Publication Data

US 2024/0267591 A1   Aug. 8, 2024

Related U.S. Application Data

(63) Continuation of application No. 17/545,082, filed on Dec. 8, 2021, now Pat. No. 11,968,426.

(30) Foreign Application Priority Data

Nov. 18, 2021   (IN) .............................. 202141053018

(51) Int. Cl.
*H04N 21/462*   (2011.01)
*H04N 21/61*   (2011.01)

(52) U.S. Cl.
CPC ..... *H04N 21/4621* (2013.01); *H04N 21/6125* (2013.01)

(58) Field of Classification Search
CPC ........... H04N 21/2358; H04N 21/2387; H04N 21/2401; H04N 21/2402; H04N 21/2408;
(Continued)

(56) References Cited

U.S. PATENT DOCUMENTS 9,443,337 B2   9/2016   Chann et al.
9,508,194 B1   11/2016   Worley, III
(Continued)

FOREIGN PATENT DOCUMENTS

WO   2009149100 A1   12/2009
WO   2020104999 A1   5/2020

OTHER PUBLICATIONS

Mikityuk, "Paradigm shift in IPTV service generation: Comparison between locally and cloud-rendered IPTV UI", 2014 IEEE 11 Consumer Communications and Networking Conference (CCNC), Jan. 10, 2014, pp. 205-212.
(Continued)

*Primary Examiner* — Gigi L Dubasky
(74) *Attorney, Agent, or Firm* — Fernando & Partners, LLP

(57) ABSTRACT

Techniques for selecting TV user interface (UI) transition characteristics are described. In accordance with various embodiments, a transition characteristics selection method is performed at a device (e.g., a cloud UI engine on a server) with one or more processors and a non-transitory memory. The UI engine receives a request for transitioning from a first screen to a second screen on a client device while in a real-time content presentation mode. In response to receiving the request and while in the real-time content presentation mode, the UI engine obtains one or more presentation conditions of the client device and selects one or more transition characteristics for transitioning from the first screen to the second screen based on costs associated with the one or more transition characteristics and the one or more presentation conditions.

18 Claims, 8 Drawing Sheets

(58) Field of Classification Search
CPC ......... H04N 21/25833; H04N 21/2662; H04N 21/44004; H04N 21/47217; H04N 21/6377; H04N 21/6582; H04N 21/8146; H04N 21/8456; H04N 21/25825; G06F 3/0481; G06F 3/04842
See application file for complete search history.

(56) References Cited

U.S. PATENT DOCUMENTS

| | | |
|---|---|---|
| 9,979,768 B2 | 5/2018 | Hoffert et al. |
| 2007/0033633 A1 | 2/2007 | Andrews et al. |
| 2015/0058409 A1 | 2/2015 | Wang |
| 2018/0124146 A1* | 5/2018 | Chen ................... H04N 21/258 |
| 2018/0160176 A1 | 6/2018 | Millar |
| 2018/0176097 A1 | 6/2018 | Russell et al. |
| 2018/0205778 A1* | 7/2018 | Forman .............. H04N 21/6377 |
| 2020/0007901 A1 | 1/2020 | Hoeben |
| 2022/0337908 A1* | 10/2022 | Leigh ..................... H04N 21/47 |
| 2022/0417571 A1* | 12/2022 | Fruchter .......... H04N 21/23655 |
| 2024/0080501 A1* | 3/2024 | Brandt ................. H04N 13/172 |

OTHER PUBLICATIONS

Extended European Search Report for corresponding EP Application No. 22202865.6 dated Mar. 7, 2023.

\* cited by examiner

SYSTEMS, DEVICES, AND METHODS FOR SELECTING TV USER INTERFACE TRANSITIONS

CROSS-REFERENCE TO RELATED APPLICATIONS

This application is a continuation of U.S. patent application Ser. No. 17/545,082, filed on Dec. 8, 2021, and hereby incorporated by reference in its entirety.

TECHNICAL FIELD

The present disclosure relates generally to multimedia content delivery and, more specifically, to selecting TV user interface (UI) transition characteristics.

BACKGROUND

Many TV centric user experiences, such as asset selection, TV guide, and/or channel banner, etc., have transition effects. Complex transition effects provide an interactive user experience but take many frames and many bits in each frame to render. While client devices with high-capacity can display complex transitions for a smooth interactive experience, such effects may overwhelm low-capacity client devices (e.g., consuming too much bandwidth, processing capacity, and/or storage), thus causing glitches and adversely affecting user experience.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1:
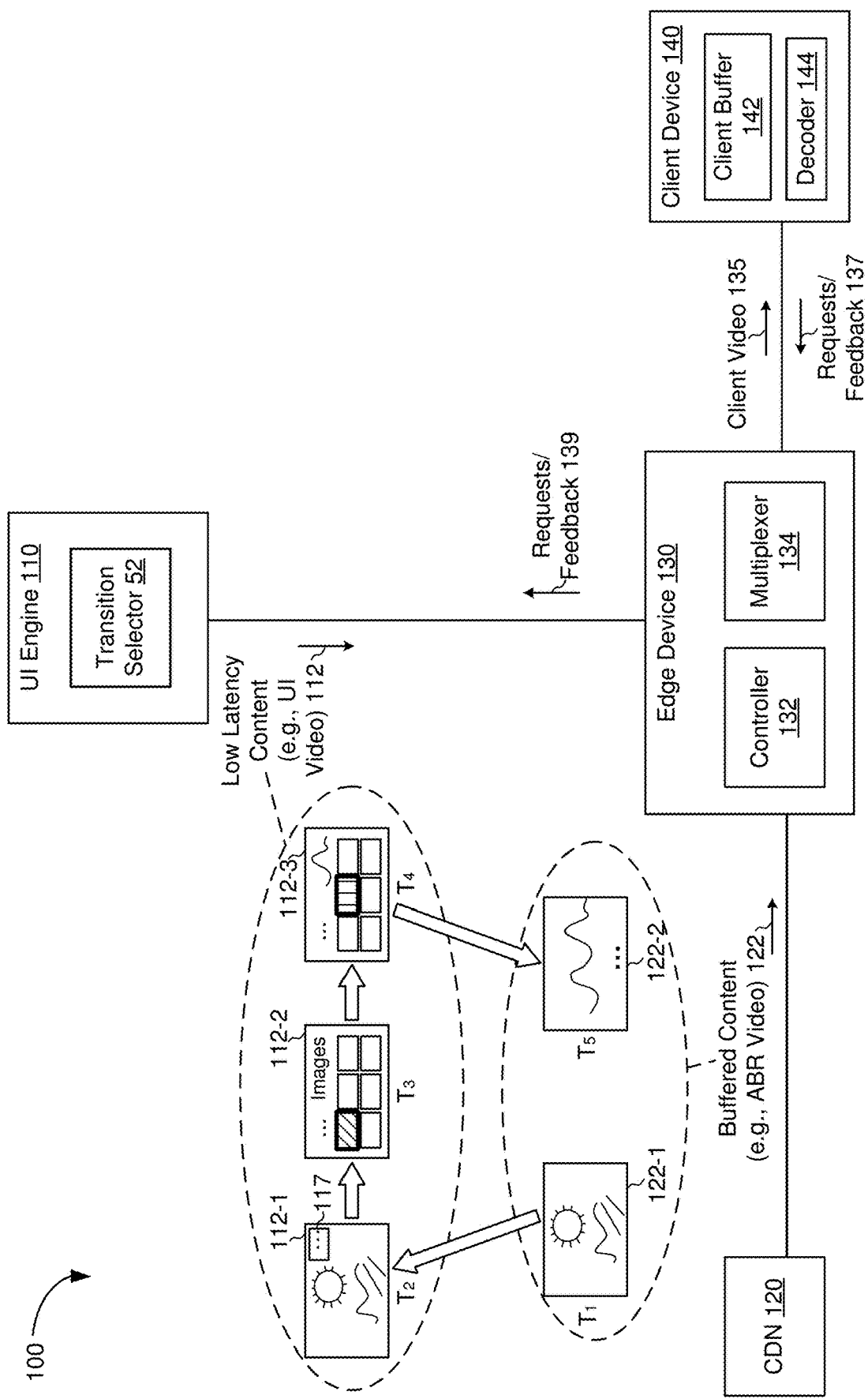
FIG. 1 is a block diagram of an exemplary multimedia content delivery system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

In accordance with some embodiments, a cloud user interface (UI) engine selects TV screen transition characteristics for client devices based on client resource availabilities for improved user experience. In a cloud TV UI rendering platform, the cloud UI engine renders TV screens for client devices to display. When in a real-time presentation mode, the UI engine prepares UIs and segments of UI videos representing screen transitions. In particular, the UI engine determines presentation condition(s) for streaming the segments of UI videos to the client devices and selects UI videos with transition characteristics appropriate for the presentation condition(s), e.g., based on the statistics received from the client device and costs of transitions. Moreover, when the presentation condition(s) change, the UI engine adjusts the transition characteristics of the UI videos in accordance with the changes, e.g., selecting a simple transition that has a lower cost in the case of a decrease in bandwidth.

In accordance with various embodiments, a TV user interface (UI) transition selection method is performed at a device (e.g., a cloud UI engine on a server) with one or more processors and a non-transitory memory. The method includes receiving a request for transitioning from a first screen to a second screen on a client device while in a real-time content presentation mode. In response to receiving the request and while in the real-time content presentation mode, the method further includes obtaining one or more presentation conditions of the client device and selecting one or more transition characteristics for transitioning from the first screen to the second screen based on costs associated with the one or more transition characteristics and the one or more presentation conditions.

Example Embodiments

A cloud user interface (UI) engine in a cloud platform disclosed herein addresses the aforementioned user experience issues and improves the user experience by selecting transition characteristics (e.g., transition effect, transition timing, transition duration, and/or transmission rate during transition) based on one or more presentation conditions. For example, while the user browses a TV UI, a portion of a media asset starts to play for a preview of the media content item. When the user indicates that they want to view the media content item in its entirety, the presentation switches from playing the media content item in a reduced-size window to full screen. The UI engine selects transition characteristics based on presentation conditions for the transition, e.g., providing more complex transition effects and a greater number of frames for the effects to client devices with high capacity and providing simple transitions that require low transmission rates to client devices with low capacity. In another example, when presenting the asset selection UI, there are multiple options for transitions as the user navigates between assets. When moving the focus from one asset to another, there is a visual resizing and highlighting of the focused asset (and reversal for the now unfocused asset) and additionally background images are shown in the UI (e.g., a representation image or video of the asset). The UI engine determines various aspects of transition characteristics for the changes in focus, the resizing and/or the highlighting of the assets depending on the presentation condition(s) on the client device to ensure a smooth transition, thus improving user experience.

Reference is now made to FIG. 1, which is a block diagram of an exemplary multimedia content delivery system 100 in accordance with some embodiments. The media content (also referred to hereinafter as "multimedia content", "media content item(s)", "media asset", or "content") can include any multimedia data, such as visual data, audio data, and/or text, etc. In some embodiments, the content delivery system 100 includes a server side for delivering multimedia content and a client side for receiving the multimedia content.

On the client side, an exemplary client device 140 includes a client buffer 142 for buffering the received media content to facilitate decoding, network interface(s) (not shown) for connecting to the server side, and a decoder 144 for decoding the received media content. In some embodiments, the client device 140 also includes input device(s) (not shown) for receiving inputs from a user, e.g., a button, a voice recorder, and/or a sensor, etc.

In some embodiments, the server side includes a virtual set top platform that renders UIs for the client device 140 and provides the rendered UIs to the client device 140. In some embodiments, upon receiving an input from the user, where the input corresponds to one or more requests 137 for media content, the client device 140 sends the request(s) 137 to the server side and receives a client video 135 from the server side. In the client video 135, low latency content 112 (e.g., one or more rendered UIs) is generated by one or more UI engines 110 on the server side. Upon receiving more request(s) indicating the user selecting a media asset, the server side delivers buffered content 122 in the client video 135, where the buffered content 122 (e.g., an adaptive bitrate (ABR) video) is provided by a content delivery network (CDN) 120 in some embodiments. In some embodiments, the client device 140 also sends feedback 137 to the server side, in which the feedback 137 includes statistical data indicating the operational status of the client device 140, such as client bandwidth, buffer condition, processing capacity, and/or storage capacity, etc.

Also in the virtual set top platform, an edge device 130 includes a controller 132 and a multiplexer 134 in accordance with some embodiments. In some embodiments, the controller 132 determines the switching between the low latency content 112 and the buffered content 122. In some embodiments, the controller 132 also determines the bandwidth allocation between the low latency content 112 and the buffered content 122. The switching can be in response to the requests from the client device 140, e.g., in response to a user pressing a pause or play button, or initiated by the server without user inputs, e.g., the server publishing a message or ceasing to display the UI upon timeout, in accordance with some embodiments.

In some embodiments, the multiplexer 134 multiplexes the low latency content 112 and the buffered content 122 into one client video stream 135. The edge device 130 then delivers the client video stream 135 to the client device 140. For example, while the edge device 130 is streaming to the client device 140 the low latency content 112, the edge device 130 is simultaneously loading the requested buffer content 122 to the client buffer 142 in preparation for switching to presenting the buffered content 122. Thus, the multiplexer 134 multiplexes the packets from the UI video 112 and the packets from the ABR video 122 into the client video stream 135 to deliver to the client device 140.

In some embodiments, the controller 132 and/or the multiplexer 134 apply one or more protocols to packetize the data, such as a Web real-time communication (WebRTC) protocol, a real-time transport protocol (RTP), a user datagram protocol (UDP), and/or an Internet protocol (IP). To prepare the media data, the UI engine 110 and content provider for the CDN 120 can apply any number of audio and video packaging techniques following any standards, such as H.264, Opus, Advanced Video Coding (AVC), or the High Efficiency Video Coding (HEVC) standard, Dynamic Adaptive Streaming over HTTP (DASH), and/or HTTP Live Streaming (HLS), etc.

In some embodiments, the edge device 130 receives from the client device 140 not only requests but also feedback 137. For example, real-time transport control protocol (RTCP) and/or WebRTC packets are exchanged between the server side and the client side for synchronization, providing performance-related statistics, rate adaptation, or the like. In some embodiments, upon receiving the requests and/or feedback 137 from the client device 140, the edge device 130 forwards requests and/or feedback 139 to the UI engine 110, so that a transition selector 52 of the UI engine 110 can derive presentation conditions of the client device 140 and determine transition characteristics accordingly.

For example, in FIG. 1, at time $T_1$, the client device 140 presents a movie scene 122-1 showing a sunny day on a road, which is part of the buffered content 122 from the CDN 120. In response to a user input, e.g., the client device 140 receiving a request 137 corresponding to the user pressing a button on a remote control, the edge device 130 forwards the request to the UI engine 110, e.g., as part of a request 139 to the UI engine 110, and obtains the UI video 112 as the low latency content from the UI engine 110. The edge device 130 then sends the UI video 112 to the client device 140 in the client video 135. At time $T_2$, the client device 140 presents a composite UI frame 112-1 from the UI video 112, showing the small window 117 displayed on top of the movie scene where the small window provides a preview of another media asset.

The UI engine 110 may receive more requests 139 from the client device 140 via the edge device 130, such as receiving one request for an asset selection screen, receiving another request for moving the focus from one asset to another on the asset selection screen, and/or receiving yet another request for selecting to view a media asset, etc. In response to receiving such requests, the UI engine 110 renders the asset selection UIs 112-2 and 112-3 to be presented by the client device 140 at time $T_3$ and time $T_4$ respectively. The edge device 130 provides the low latency content 112-1, 112-2, and 112-3 from the UI engine 110 to the client device 140 and switches to streaming buffered content 122-2 at time $T_5$.

In some embodiments, the UI engine 110 prepares not only the screens 112-1, 112-2, and 112-3, but the transitions from one screen to another between $T_1$ to $T_5$, e.g., providing UI video segments that correspond to the transitions from the composite UI 112-1 to the asset selection UIs 112-2 and UI 112-3 and then to the buffered content 122-2. Moreover, the transition selector 52 selects transition characteristics based on presentation conditions and costs of transitions. As will be described in further detail below, between time $T_2$ and $T_4$, the client device 140 is in a real-time content presentation mode and presents the low latency content 112 from the UI engine 110. While in the real-time content presentation mode, depending on the presentation conditions and the costs for the transitions, the UI engine 110 prepares complex transitions for the transitions that have higher costs for certain client devices 140 (e.g., high end client devices with more processing and storage capacities and/or fast network connections). Alternatively, the UI engine 110 prepares simple transitions or still images, which have lower costs, for client devices 140 that have low capacity and/or slower network connections.

Although a single UI engine 110, a single CDN 120, a single edge device, and a single client device 140 are illustrated in FIG. 1, the system 100 may include one or more UI engines 110, e.g., pool(s) of UI engines 110 for providing UIs and/or multiple CDN instances 120 for providing ABR videos to a plurality of client devices 140 via a plurality of edge devices 130. In some embodiments, the pool of UI engines 110 serves as virtual set-top-boxes (STBs) for the plurality of client devices 140. For the sake of simplicity, the subject matter will be described hereinafter for the most part with reference to a single UI engine 110, a single CDN 120, a single edge device 130, and a single client device 140.

Further, one or more components and/or functions of the UI engine 110, the CDN 120, and/or the edge device 130 may be distributed and/or re-arranged. As such, the server side of the content delivery system 100 can include more, less, and/or different elements than shown in FIG. 1. Each of the component in the content delivery system 100 can include appropriate hardware, software, and/or firmware to perform the operations attributed to the element herein. Operation(s) attributed to an element in the content delivery system 100 herein should not be considered binding and in some embodiments, other element(s) in the exemplary system 100 may additionally or alternatively perform such operation(s).

Figure 2:
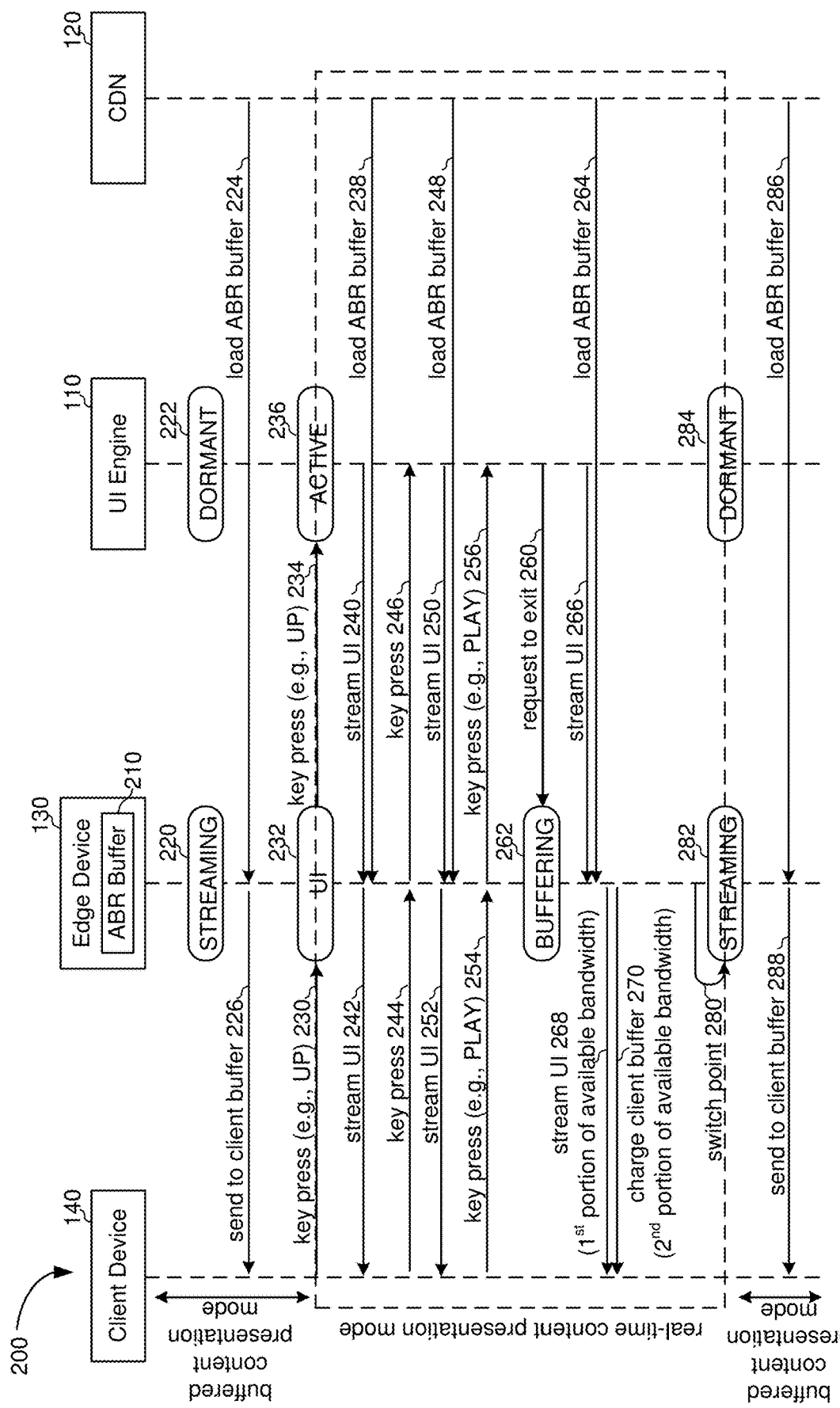
FIG. 2 is a sequence diagram illustrating state transitions in response to user inputs in the exemplary multimedia content delivery system, in accordance with some embodiments.

FIG. 2 is a sequence diagram 200 illustrating state transitions in response to user inputs in the exemplary content delivery system 100 in accordance with some embodiments. In some embodiments, when the edge device 130 streams buffered content to the client device 140, such as streaming an ABR video to the client device 140, the edge device 130 is in a streaming state 220. When the edge device is in the streaming state 220, the UI engine 110 is in a dormant state 222. As such, the edge device 130 streams the ABR video without showing UI elements, e.g., presenting a full screen ABR video without showing a timeline or action menus.

In some embodiments, the edge device 130 includes an ABR buffer 210 for storing at least a portion of the buffered content received from the CDN 120, e.g., N seconds of an ABR video. The ABR buffer 210 can be drained when the edge device 130 sends the buffered content to the client device 140, as will be described in steps 226, 270, and 288 below. The CDN 120 sends the buffered content to the edge device 130 and the edge device 130 loads the buffered content to the ABR buffer 210 in step 224. In step 226, the edge device 130 sends the buffered content to the client device 140 to fill a client buffer on the client device 140 (e.g., the client buffer 162, FIG. 1), e.g., filling N seconds of the ABR video in the client buffer.

In some embodiments, when the client device 140 receives a user input, such as the user pressing an up button on a remote control to change a channel, the client device 140 sends the key press as a request for a UI to the edge device 130 in step 230 along with other information, e.g., session state cookies indicating a UI is being displayed, a UI is being requested, user interactions, network information (e.g., client IP), geographical information, a client user agent, a timestamp, a household identifier, a device identifier, a device type, and/or media content item identifier, etc. The edge device 130, in response to receiving the request, enters a UI state 232 and passes the request to the UI engine 110 in step 234. In response to receiving the request, the UI engine 110 enters an active state 236 and generates a UI (e.g., rendering a UI video) that captures the result of the user action. The resulting UI video is relayed and streamed to the client device 140 via the edge device 130 in steps 240 and 242. In some embodiments, the edge device 130 continues receiving the ABR data from the CDN 120 in step 238, but ceases transmission of the ABR data to the client device 140 when the edge device is in the UI state 232.

In some embodiments, the user may further interact with the UI, e.g., the client device 140 detecting one or more key presses. For each key press, the client device 140 sends a request to the edge device 130 in step 244, and the edge device 130 again passes the request to the UI engine 110 in step 234. In response to receiving the request, the UI engine 110 renders more UI video frames that capture the result of the user action. The resulting UI video is relayed and streamed to the client device 140 via the edge device 130 in steps 250 and 252. Further, in some embodiments, the edge device 130 continues loading the ABR data from the CDN 120 in step 248, but ceases transmission of the ABR data to the client device 140 when the edge device is in the UI state 232.

In step 254, the client device 140 sends a user input to the edge device 130, e.g., the user pressing the play button, and the edge device 130 forwards the key press to the UI engine 110 in step 256. In some embodiments, the UI engine 110 determines that the user input corresponds to a pre-defined user input, which indicates a request to exit the UI. The UI engine 110 signals the edge device 130 to exit the UI state 232 in step 260 and enter a buffering state 262 so that the requested ABR video can be played to the user.

In the buffering state 262, the edge device 130 loads the ABR data from the CDN 120 in step 264, e.g., loading the requested ABR video. Further, in the buffering state 262, the edge device 130 continues to receive the UI video from the UI engine 110 as shown in step 266. In step 268, the edge device continues to stream the UI video to the client device 140 and at the same time attempts to charge the client buffer by transmitting the content of the ABR buffer 210 to the client device 140 in step 270. In some embodiments, when the client buffer is filled with a deep set of ABR frames to ensure a good user experience, e.g., ABR data in the client buffer that are more than a threshold amount, the edge device 130 identifies a switch point 280 and exits the buffering state 262 to enter a streaming state 282, e.g., switching at the next occurring I-frame. Further, when the edge device 130 enters the streaming state 282, the UI engine 110 enters a dormant state 284 to stop providing the UI video to the edge device 130. As such, the edge device streams the ABR video without showing further UI elements. To stream the ABR video, the CDN 120 loads the ABR buffer 210 in step 286 to the edge device 130, so that the edge device 130 can send the ABR video frames to the client device 140 to fill the client buffer in step 288.

In FIG. 2, the UI engine 110, upon entering the active state 236, generates UIs including the transitions among UIs, and the edge device 130 streams the UIs for presentation on the client device 140 until the UI engine 110 exits the active state 236 and enters the dormant state 284. Thus, as indicated by the box with dashed borders, the client device 140 is in a real-time content presentation mode when presenting the low latency content from the UI engine 110 after entering the active state 236 and before exiting the dormant state 284. In the real-time content presentation mode, the depth of the client buffer filled with the UI video frames is less than a threshold, e.g., 250 ms of UI video frames. As such, in the real-time content presentation mode, the low latency content fills the client buffer with a short buffer of content for providing immediate UI responses, e.g., real-time responses. In the real-time content presentation mode and while presenting the low latency content, in the case of a decrease in the client bandwidth, the UI engine 110 can immediately adjust the transition characteristics, e.g., reducing the number of bits required to keep the UI video going, so that the user would not see glitches.

In addition to the real-time presentation mode, the client device 140 can also operate in a buffered content presentation mode. In the buffered content presentation mode, the edge device fills the client buffer with a large buffer of content, e.g., filling 10 s of seconds of playback video-on-demand (VOD) content. As shown in FIG. 2, when the UI engine 110 exits the active state 236, e.g., after entering the dormant state 222 or after entering the dormant state 284, the client device 140 is in the buffered content presentation mode and presenting at least a portion of the buffered content from the CDN 120. Because of the deep buffer, in the buffered content presentation mode, when the client bandwidth temporarily drops, the edge device 130 can re-transmit the buffered content (e.g., the ABR frames) to re-fill the large buffer. As a result, the client device can recover from potential packet loss and the user would not notice any glitches. In some embodiments, the UI engine 110 also determines various aspects of transition characteristics for transitioning between the real-time content presentation mode and the buffered content presentation mode based on the presentation condition(s) for improved user experience.

Figure 3:
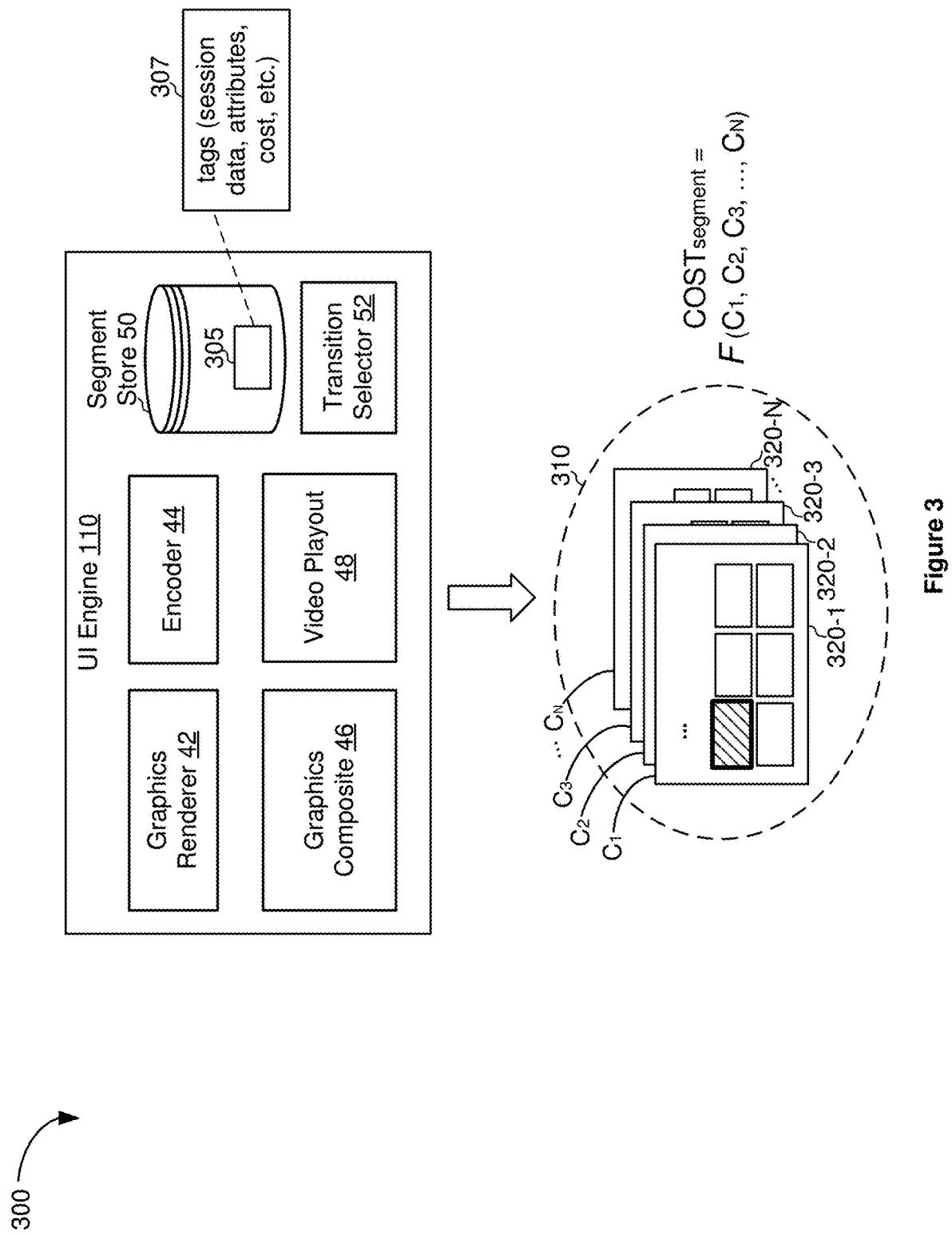
FIG. 3 is a block diagram illustrating transition cost determination, in accordance with some embodiments.

FIG. 3 is a diagram 300 illustrating transition cost determination in accordance with some embodiments. In some embodiments, the UI engine 110 includes a graphics renderer 42 for rendering UI artifacts into rendered UI objects, an encoder 44 (or a re-encoder) for encoding segments of UI videos, a graphics composite module 46 (also referred to hereinafter as the graphics composite 46) for compositing UI objects with videos, a video playout 48 for recording or playing the segments, a segment store 50 for storing rendered UI objects, and the transition selector 52 for selecting transition characteristics when generating low latency content for the client devices. Though not shown, in some embodiments, the UI engine 110 includes a video buffer for storing a common source of decoded video frames that would be composited with the rendered UI objects for generating personalized UIs.

For example, to prepare a UI video including the composite UI frame 112-1 as shown in FIG. 1, the UI engine 110 obtains a stream corresponding to the movie from an ABR source (e.g., the CDN 120, FIG. 1). In some embodiments, the UI engine 110 stores a portion of decoded ABR frames in the video buffer. The graphics renderer 42 renders the small window 117, e.g., showing a preview of another channel, and the encoder 44 encodes the small window 117. The graphics composite module 46 then composites a unique UI for the client by placing the small window 117 over the ABR frames stored in the video buffer, and the video playout 48 plays out the composite UI video, which includes the small window 117 displayed on top of the movie scene. Upon receiving the composite UI video, the edge device (e.g., the edge device 130, FIG. 1) sends to the client.

Still referring to FIG. 3, in some embodiments, for improved rendering efficiency, the segment store 50 stores rendered UI objects 305, e.g., rendered banners, rendered progress indicators, rendered play/pause buttons, rendered highlighted selected tiles, rendered video play UI, and/or rendered transition segments, etc. The rendered UI objects 305 represent UI artifacts that can be reused many times, e.g., for many users or for the same user, to allow fast UI rendering for the client devices.

In some embodiments, the rendered UI objects 305 stored in the segment store 50 are tagged with metadata 307. The metadata 307 include session data (e.g., user, screen, highlight, key, etc.), attributes (e.g., duration), as well as the cost of presenting the rendered UI objects 305 in accordance with some embodiments. The metadata 307 enable indexing of the rendered UI objects 305 in the segment store 50 to facilitate searching of the rendered UI objects 305 when reusing the rendered UI objects 305. Further, the metadata 307 facilitate the composition and/or selection of the segments of UI videos corresponding to transitions from one screen to another. As such, the UI engine 40 selects the rendered UI objects 305 based on the metadata associated with the rendered UI objects 305 in accordance with some embodiments.

In some embodiments, when generating the rendered UI objects 305, the UI engine 40 describes how to animate the UI objects to achieve the transition, e.g., fast or slow rendering, the number of intermediate frames, and/or a simple still image transition. Accordingly, when generating the rendered UI objects 305, the corresponding metadata 307 specify the cost of presenting the rendered UI in the form of specifying the attributes and/or characteristics of the transition. In some embodiments, the cost of transitions is measured when the transition is composed to determine the minimal thresholds of connections for the transition play out successfully. In such embodiments, different transitions are prepared for different connection thresholds, e.g., a simple transition with a low cost for a connection speed less than a first threshold and a complex transition with a high cost for a connection speed higher than a second threshold, etc.

In some embodiments, to prepare a segment of UI video corresponding to a transition, the UI engine 40 instructs the video playout 48 to retrieve the rendered UI object(s) 305 from the segment store 50 and play the rendered UI object(s) 305 for compositing a segment of UI video corresponding to the transition. In such embodiments, the costs in the metadata 307 for the rendered UI object(s) 305 retrieved from the segment store 50 are used by the transition selector 52 for determining the cost of playing the segment of UI video.

For example, the UI engine 110 composes a UI video segment 310 (also referred to hereinafter as the segment 310) corresponding to a transition for a client device. The segment 310 includes a plurality of frames 320-1, 320-2, 320-3, . . . , 320-N, collectively referred to hereinafter the plurality of frames 320. Each of the plurality of frames 320 includes multiple UI artifacts, such as a box with highlights corresponding to an asset in focus, multiple rows of representation images of assets for selection, etc. In some embodiments, the UI engine 110 dynamically adapts a transition for a connection when the cost of the transition does not meet the connection threshold requirement. For example, when there is one transition available and the cost is higher than the threshold requirement for a connection, the UI engine 110 can drop one or more frames (e.g., changing the frame count) or lower the bitrate of frames automatically to adapt the transition to the slower connection. In such embodiments, the transition selector 52 configures the encoder 44 to reduce the frame rate and/or the bit rate in the event of not having a lower rate transition to select.

In some embodiments, the cost of playing the segment 310, e.g., in bits and/or bitrate, is calculated as a function of the costs of the rendered UI objects for the multiple UI artifacts in the plurality frames. Further, in some embodiments, the cost for the segment 310 is calculated as a function of the costs for the plurality of frames 320-1, e.g., $COST_{segment}=F(C_1, C_2, C_3, \ldots, C_N)$, where $C_1$ is the cost for the frame 320-1, $C_2$ is the cost for the frame 320-2, $C_3$ is the cost for the frame 320-3, . . . , and $C_N$ is the cost for the frame 320-N. The transition selector 52 can then select or facilitate composing a segment with the cost appropriate for the presentation conditions at the client device. In some embodiments, the cost calculation also takes into the consideration of the type of the frames in the transition. Certain transitions cause the display of large individual pictures, e.g., I-frames. For example, a transition that swaps to a large new image will require the new image to be represented as an I-frame, which is large in size relative to other types of frames such as P-frames or B-frames. Such a transition would have higher cost as compared to a transition that is a slide of the original image, e.g., a series of smaller P-frames. A transition that includes individually large frames may be harder to deliver on restricted bandwidth networks, as the client device will not be able to decode until it gets the full I-frame.

It should be noted that although FIG. 3 illustrates the segment store 50 as part of the UI engine 110, the segment 50 can be a separate component from the UI engine 110. For example, the segment store 50 can shared by a pool of UI engines hosted by a VM and shared by the pool of UI engines. In some embodiments, the segment store 50 can be local to the UI engine 40 or on a separate virtual machine, instance, and/or device, e.g., shared by multiple virtual machines or local to the edge device 130 (FIG. 1). Likewise, the graphics renderer 42, the encoder 44, the graphics composite module 46, the video playout 48, and/or the transition selector 52 can be local to the UI engine 110, shared by a pool of UI engines, and/or separate and distinct from the UI engine 110. Those skilled in the art will appreciate from the present disclosure that various other features and configurations have not been illustrated for the sake of brevity, and so as not to obscure more pertinent aspects of the embodiments disclosed herein.

Figure 4:
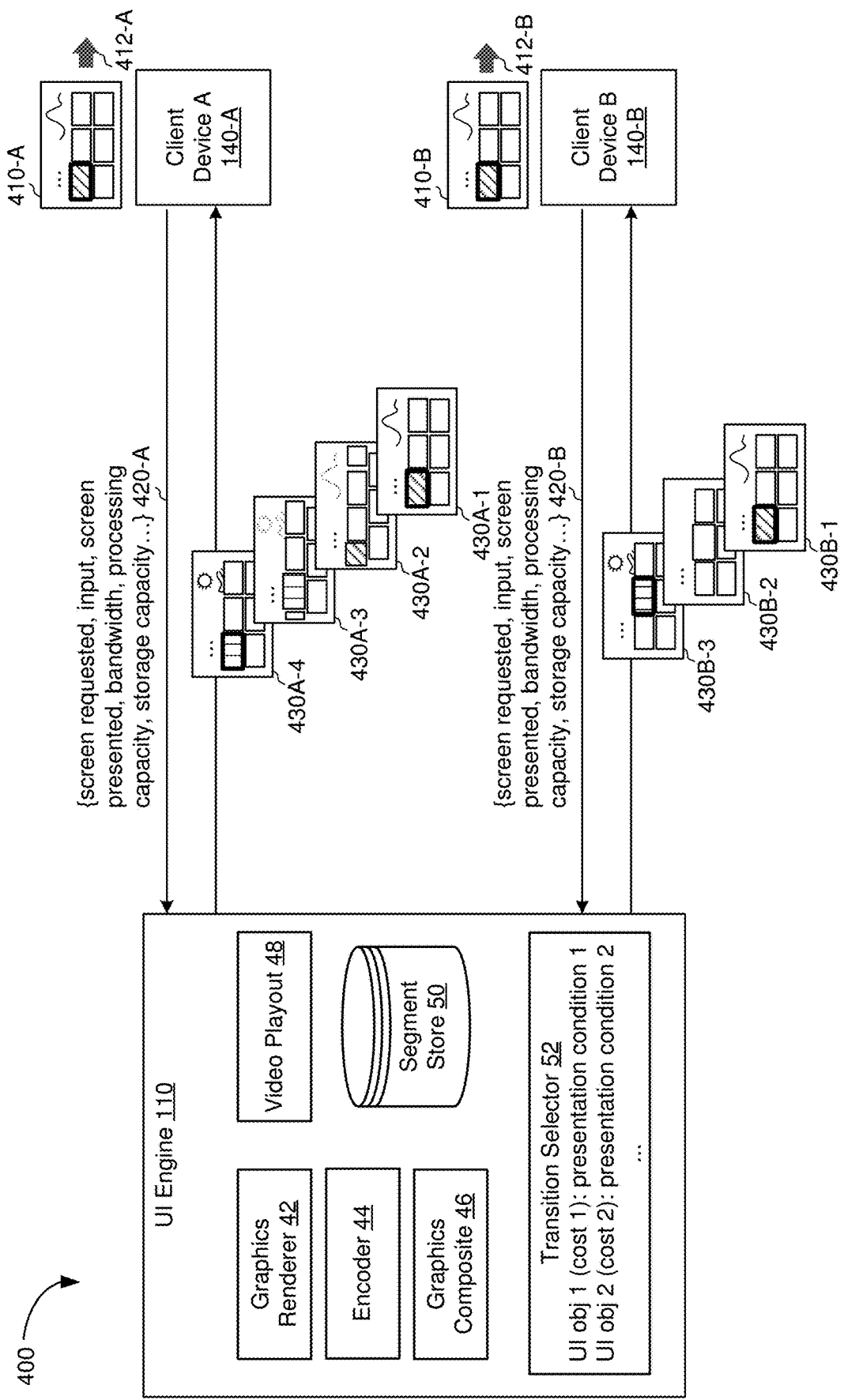
FIG. 4 is a diagram illustrating selecting various transition characteristics based on costs and presentation conditions, in accordance with some embodiments.

FIG. 4 is a diagram 400 illustrating selecting various transition characteristics for the client devices 140 based on costs and presentation conditions in accordance with some embodiments. In FIG. 4, the UI engine 110 receives requests as well as statistical parameters 420 from the client devices 140, e.g., receiving requests and statistical parameters 420-A from client device A 140-A and receiving requests and statistical parameters 420-B from client device B 140-B. In some embodiments, the presentation conditions include instantaneous bandwidth information as well as statistical measurements about quality of bandwidth in recent time period to guard against fluctuations in bandwidth, e.g., connections that are mostly great and high bandwidth but with periods of glitches and/or latency. In some embodiments, the transition selector 52 facilitates the derivation of presentation conditions from the requests and statistical parameters 420. Further, in some embodiments, the transition selector 52 facilitates selecting transition characteristics of transitions presented on the client devices 140 based on the presentation conditions and the costs of the transitions.

For example, in FIG. 4, the UI engine 110 receives requests and/or the statistical parameters 420-A from client device A 140-A, which include the screen requested, the input (e.g., a right key press 412-A), the screen presented (e.g., a UI 410-A), the available bandwidth, the processing capacity, and/or the storage capacity associated with client device A 140-A. Also as shown in FIG. 4, the UI engine 110 receives requests and/or the statistical parameters 420-B from client device B 140-B, which include the screen requested, the input (e.g., a right key press 412-B), the screen presented (e.g., a UI 410-B), the available bandwidth, the processing capacity, and/or the storage capacity associated with client device B 140-B.

In the example shown in FIG. 4, the UIs 410-A and 410-B are the same, e.g., showing the same asset selection screen with the first asset being in focus and with the same background images showing a preview of the first asset. Further, the users at both client device A 140-A and client device B 140-B press the same key 412-A and key 412-B to request moving the focus from the first asset to the second asset. However, because client device A 140-A and client device B 140-B have different presentation conditions 420-A and 420-B, the UI engine 110 generates a UI video 430A (e.g., including frames 430A-1, 430A-2, 430A-3, and 430A-4) for client device A 140-A and generates a UI video 430B (e.g., including frames 430B-1, 430B-2, and 430B-3) for client device B 140-B for the transitions, where the UI video 430A is different from the UI video 430B.

In particular, the UI video 430A has more frames and/or more complex transition effects (e.g., scrolling the top row to the left, resizing of the asset in focus, fading in/out the background images, etc.) than the UI video 430B. The more frames and/or more complex transition effects consume more bits. Accordingly, the UI video 430A has a higher cost than the UI video 430B, e.g., more bits and/or requires more bandwidth. When the presentation conditions on client device A 140-A indicate client device A 140-A can receive and present the UI video 430A, e.g., the processing capacity is higher than a threshold for processing the number of bits, the client buffer is larger than a threshold for receiving the UI frames, and/or the network bandwidth is higher than a threshold, the transition characteristics of the UI video 430A are chosen for the UI video 430A for client device A 140-A. In other words, with the presentation conditions on client device A 140-A, the UI video 430A would play without glitches. On the other hand, based on the statistical parameters 420-B, the UI engine 110 determines that the UI video 430B with a fewer number of frames and without complex transition effects is suitable for the presentation conditions on client device B 140-B. Thus, based on the costs for the UI videos 430A and 430B and the presentation conditions of the client devices 140, the transition selector 52 selects the UI video 430A for client device A 140-A and selects the UI video 430B for client device B 140-A.

Figure 5:
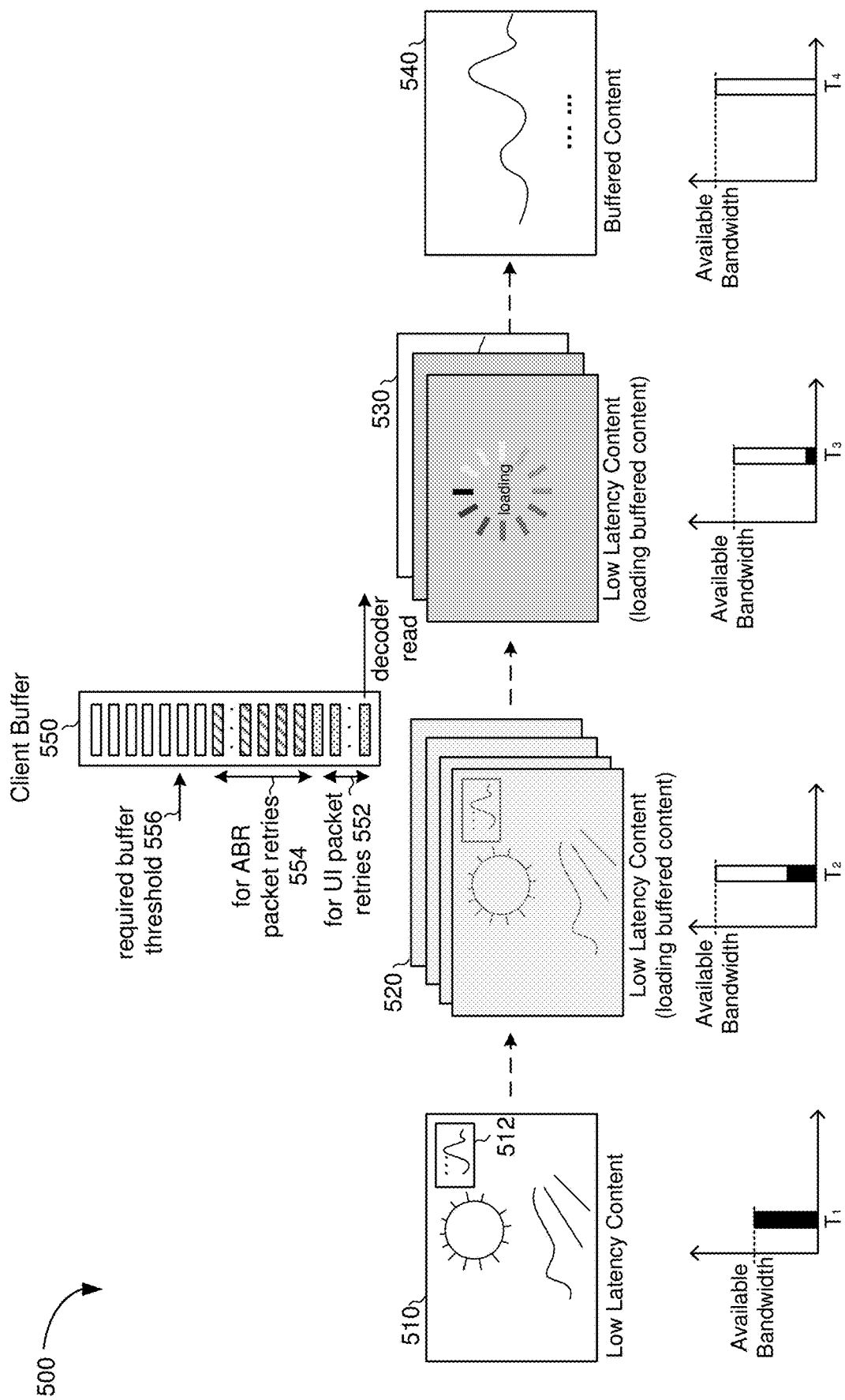
FIG. 5 is a diagram illustrating various presentation conditions for transition selection, in accordance with some embodiments.

FIG. 5 is a diagram 500 illustrating various presentation conditions for transition selection in accordance with some embodiments. In some embodiments, an edge device (e.g., the edge device 130, FIG. 1) receives requests and/or feedback from client devices and passes the requests and/or feedback to a UI engine (e.g., the UI engine 110 in FIGS. 1-4) for transition selection. In some embodiments, the determination of presentation conditions on the client devices and the transition selection illustrated in FIG. 5 are performed by the UI engine (e.g., the UI engine 110 in FIGS. 1-4).

At time $T_1$, when the edge device receives a user input, such as a key press, the edge device switches to a UI state (e.g., the UI state 232, FIG. 2) and streams low latency content, e.g., an exemplary frame 510 in a UI video for the client device to present at time $T_1$. As described above with reference to FIG. 2, the UI engine 110 enters an active state (e.g., the active state 236, FIG. 2) when the edge device switches to the UI state so the UI engine starts providing low latency content (e.g., UIs) to the client device and the client device presents the UI in the real-time content presentation mode. Thus, at time $T_1$, the edge device allocates the available bandwidth to sending the low latency content, including the frame 510 showing a small window 512 for providing a preview of another media asset on top of a movie scene.

The user may further interact with the UI, such as pressing one or more keys to navigate before selecting a media asset to play. Upon obtaining the inputs, the client device sends the inputs along with other session data to the edge device, which forwards the requests to the UI engine. When the UI engine detects a pre-defined user input (e.g., the play button) indicating a request to end the UI state, the edge device enters a buffering state (e.g., the buffering state 262, FIG. 2). In the buffering state, while the low latency content corresponding to one or more transitions to the selected media asset is streamed to the client device, the edge device is also loading the selected media asset into the client buffer. As such, at time $T_2$, the edge device allocates a portion of the available bandwidth to loading the buffered content, e.g., to fill a portion 554 of a client buffer 550 with ABR frames for ABR packet retries, and allocates another portion of the available bandwidth to streaming a segment of a UI video 520 corresponding to the transition, e.g., to fill another portion 552 of the client buffer 550 with UI packets for UI packet retries. In some embodiments, to achieve the bandwidth allocation, the edge device alters the presentation conditions after receiving the presentation conditions in real time from the client device but before passing to the UI engine. Passing the modified presentation conditions allows the UI engine to select a lower cost transition so that the portion of the available bandwidth allocated to streaming the UI video 520 would be sufficient. The decoder on the client device reads the UI packets from the client buffer 550 to prepare the presentation of the low latency content on the client device.

In some embodiments, the bandwidth and/or the bandwidth allocation represent the presentation conditions on the client device. While in the real-time content presentation mode, based on the available bandwidth and/or the bandwidth allocated to the low latency content and/or the buffered content, the UI engine selects the transition characteristics appropriate for the bandwidth, e.g., the bitrate of playing the transition with certain transition characteristics is no more than the bitrate allocated to the low latency content.

As explained above with reference to FIG. 3, complex transition effects, longer transition durations, and/or more frames, etc., correspond to a higher cost and the UI engine selects transitions with such transition characteristics for client devices with more available bandwidth and/or more bandwidth allocated to the low latency content. Conversely, simple transition effects, shorter segments, and/or fewer frames correspond to a lower cost and the UI engine selects transitions with such transition characteristics for client devices with less available bandwidth and/or less bandwidth allocated to the low latency content. For example, during the transition, at time $T_3$, the UI engine changes to a segment of UI video 530 for the transition in response to detecting a decrease in the available bandwidth. The UI engine determines that rendering a spinning wheel as a progress indicator (instead of rendering the fading in and fading out transition effect) is less complex and has a lower cost. As such, in response to the decrease in bandwidth, the UI engine adjusts the transition characteristics accordingly and switches from the segment 520 to the segment 530 at time $T_3$.

In some embodiments, the client buffer status represents the presentation conditions on the client device. For example, the decision by the UI engine 110 to switch to the segment 530 is also based on the buffer condition of a client buffer 550. In some embodiments, the edge device uses a required buffer threshold 556 to facilitate the determination of the switch point 280 (FIG. 2). In some embodiments, the required buffer threshold 556 defines how full the client buffer 550 on the client device ought to be for the switching to take place. Once reaching the required buffer threshold 556, there is sufficient buffered content (e.g., ABR frames) for the system to provide a strong quality of experience.

To fill the client buffer 550 within a time limit, e.g., as quickly as possible for an interactive user experience, sufficient bandwidth is required for loading the ABR frames into the client buffer 550. Accordingly, when loading the client buffer 550, based on the status of the client buffer 550 (e.g., the percentage of the client buffer 550 being filled) and/or the required bandwidth threshold 556, the edge device selects the bandwidth allocation and/or adjusts the transmission rate to increase the chance of reaching the required buffer threshold 556. For example, the edge device may allocate the bandwidth to loading the ABR frames such that the transmission rate of the ABR frames is inversely proportional to the bits stored in the client buffer 550. Accordingly, based on the depth of the client buffer 550 and the required bandwidth threshold 556, the UI engine can adjust the transition characteristics and switch from the segment 520 to the segment 530 at time $T_3$ to increase the chance of reaching the required buffer threshold 556 for a swift transition to presenting the buffered content 540 at time $T_4$.

Figure 6A:
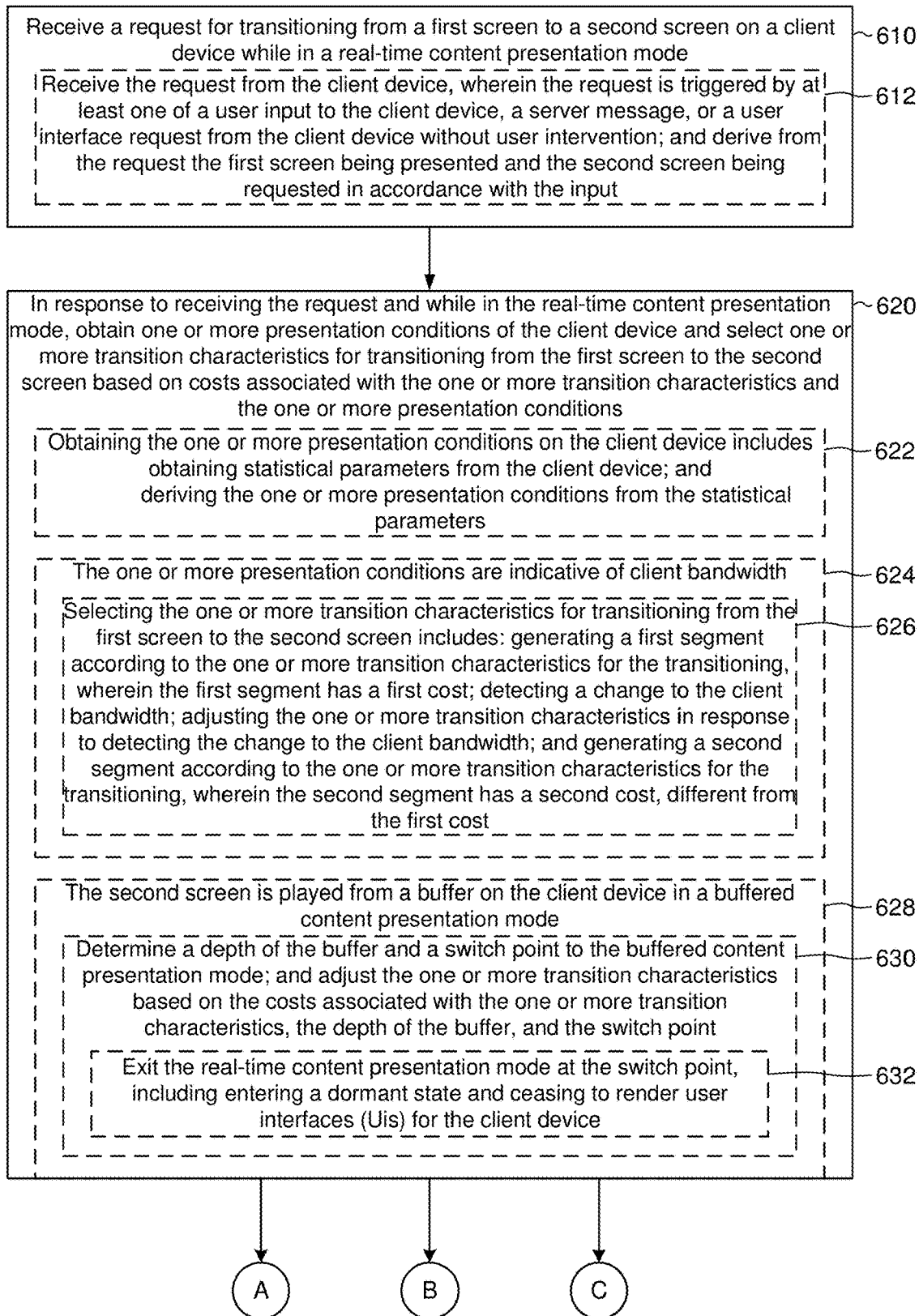
FIGS. 6A and 6B are flowcharts illustrating a transition characteristics selection method, in accordance with some embodiments.
Figure 6B:
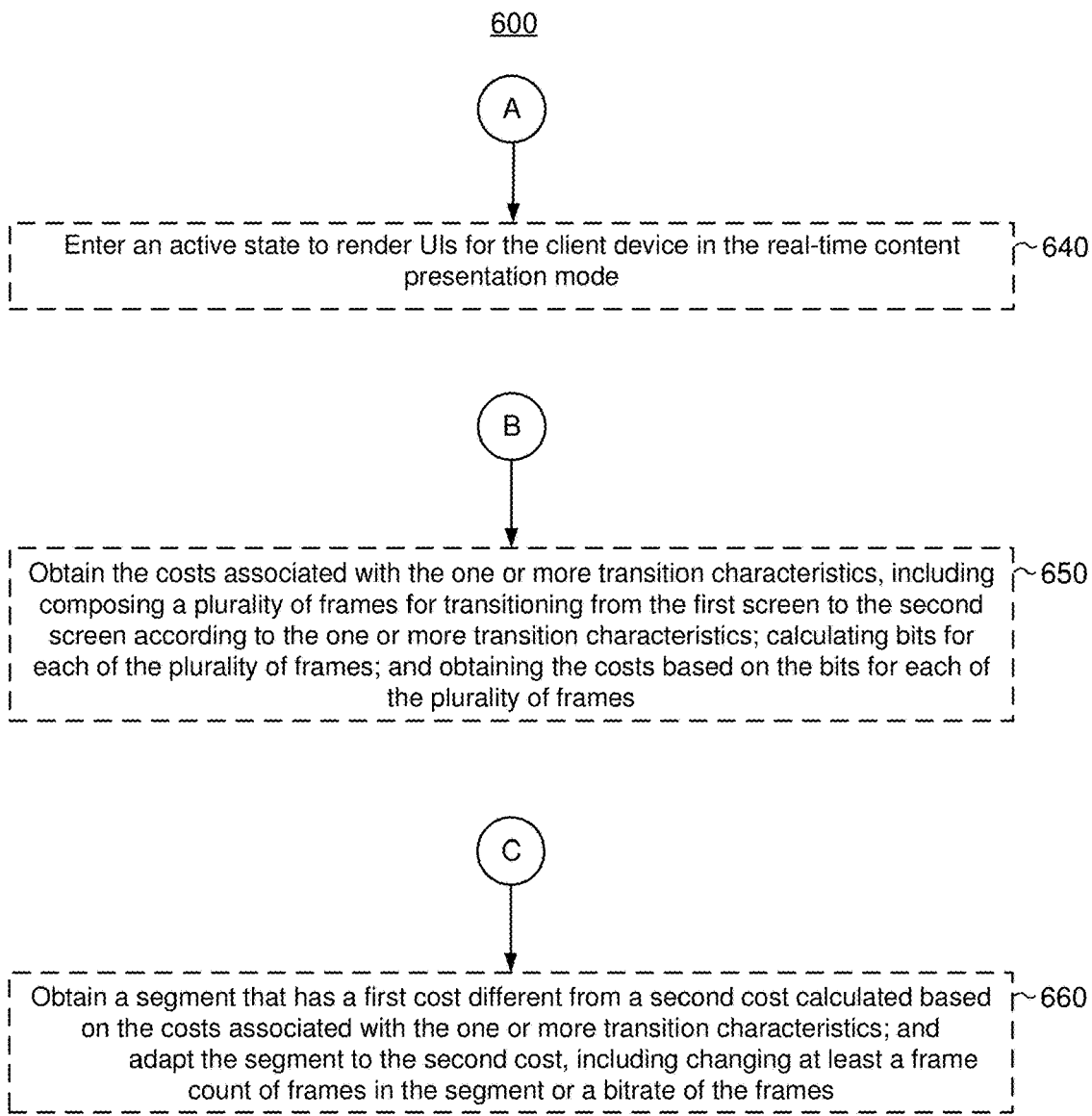

FIGS. 6A and 6B are flowcharts illustrating a transition selection method 600 in accordance with some embodiments. In some embodiments, the transition selection method 600 is performed by a UI engine on the server side, e.g., the UI engine in FIGS. 1-4. In some embodiments, the UI engine includes one or more processors and a non-transitory memory.

The method 600 begins with the UI engine receiving a request for transitioning from a first screen to a second screen on the client device while in a real-time content presentation mode, as represented by block 610. In some embodiments, as represented by block 612, receiving the request for transitioning to the second screen on the client device includes receiving the request from the client device, where the request is triggered by at least one of a user input to the client device, a server message, or a user interface request from the client device, and deriving from the request the first screen being presented and the second screen being requested in accordance with the input. For example, in FIG. 1, the edge device receives the requests 137 from the client device 140 and passes the requests 139 to the UI engine when the UI engine is active and generates UIs for the client device 140. A respective request 139 can include session information such as key press, user identifier, screen 112-2, highlight one tile, etc. In some embodiments, the server generates the request without user inputs. For example, the server may push a notification or a banner to the client device, e.g., as a server message. In another example, a timed or automated user interface request without immediate user input or user intervention from the client device, such as auto play, may cause the user screen to display an action menu over the video.

As represented by block 620, the method 600 continues with the UI engine in response to receiving the request and while in the real-time content presentation mode, obtaining one or more presentation conditions of the client device and selecting one or more transition characteristics for transitioning from the first screen to the second screen based on costs associated with the one or more transition characteristics and the one or more presentation conditions. In other words, the UI engine is aware of the cost of transitions and can change its behavior to select transition characteristics corresponding to complex or simple transitions (or even no transitions), e.g., changing the number of frames and/or the bits in each frame, to move between one screen to another.

In some embodiments, as represented by block 622, obtaining the one or more presentation conditions on the client device includes obtaining statistical parameters from the client device, and deriving the one or more presentation conditions from the statistical parameters. For example, the statistical parameters from the client device include packet loss, historical (e.g., time window) of successful bitrate, decoded packet counter, successfully decoded frames, video stalls, buffer depth, CPU usage, Wi-Fi signal strength, etc. For example, in FIG. 5, the UI engine can derive from the statistical parameters presentation conditions such as bandwidth, processing and storage capacity (e.g., buffer status), etc.

In some embodiments, as represented by block 624, the one or more presentation conditions are indicative of client bandwidth. In such embodiments, as represented by block 626, selecting the one or more transition characteristics for transitioning from the first screen to the second screen includes generating a first segment according to the one or more transition characteristics for the transitioning, wherein the first segment has a first cost, detecting a change to the client bandwidth, adjusting the one or more transition characteristics in response to detecting the change to the client bandwidth, and generating a second segment according to the one or more transition characteristics for the transitioning, wherein the second segment has a second cost, different from the first cost. For example, in FIG. 5, the UI engine generates and switches to the segment 530 in response to detecting a drop in bandwidth. Relative to the segment 520, the segment 530 has transition characteristics, e.g., less complex, fewer number of frames, that correspond to a lower cost.

In some embodiments, as represented by block 628, the second screen is played from a buffer on the client device in a buffered content presentation mode. In such embodiments, as represented by block 630, the method 600 further includes determining a depth of the buffer and a switch point to the buffered content presentation mode, and adjusting the one or more transition characteristics based on the costs associated with the one or more transition characteristics, the depth of the buffer, and the switch point in accordance with some embodiments. Further in such embodiments, as represented by block 632, the method 600 includes exiting the real-time content presentation mode at the switch point, including entering a dormant state and ceasing to render user interfaces (UIs) for the client device.

For example, in FIG. 5, the UI obtains a request to transition to presenting the buffered content 540. Based on the depth of the client buffer 550, the required buffer threshold 556, and the costs for the segment 520 with more complex transition characteristics, the UI engine adjusts the transition characteristics and provides the segment 530 with simpler transition effects and lower cost. The changes in the UI allow more bandwidth to load the client buffer 550 with ABR frames, thus filling the client buffer 550 faster and improving the chance of reaching the switch point quickly. Once the switch point is reached, the client device is in the buffered content presentation mode to stream the buffered content 540 from the CDN. Accordingly, the UI engine enters the dormant state 284 (FIG. 2) to cease rendering UIs for the client device when the client device is in the buffered content presentation mode.

Turning to FIG. 6B, in some embodiments, as represented by block 640, the method 600 further includes entering an active state to render UIs for the client device in the real-time content presentation mode. As such, as shown in FIG. 2, the UI engine renders UIs for the client device 140 when the UI engine enters the active state 232 and ceases to render UIs for the client device 140 when the UI engine enters the dormant state 284. Also as shown in FIG. 1, the UI engine renders not only the screens 112-1, 112-2, and 112-3, but also the transitions among the screens 112 and 122.

In some embodiments, as represented by block 650, the method 600 further includes obtaining the costs associated with the one or more transition characteristics. In some embodiments, the UI engine obtains the costs by composing a plurality of frames for transitioning from the first screen to the second screen according to the one or more transition characteristics, calculating bits for each of the plurality of frames, and obtaining the costs based on the bits for each of the plurality of frames. In other words, transitions take frames to render and bits to render each frame. Thus, as shown in FIG. 3, the total cost for the transition is calculated based on the number of frames and the bits in each frame.

In some embodiments, as represented by block 660, the method 600 further includes obtaining a segment that has a first cost different from a second cost calculated based on the costs associated with the one or more transition characteristics, and adapting the segment to the second cost, including changing at least a frame count of frames in the segment or a bit rate of the frames. For example, when there is one transition available and the cost is higher than the threshold requirement for a connection, the UI engine can drop one or more frames or lower the bitrate of frames automatically to adapt the transition to the slower connection.

Figure 7:
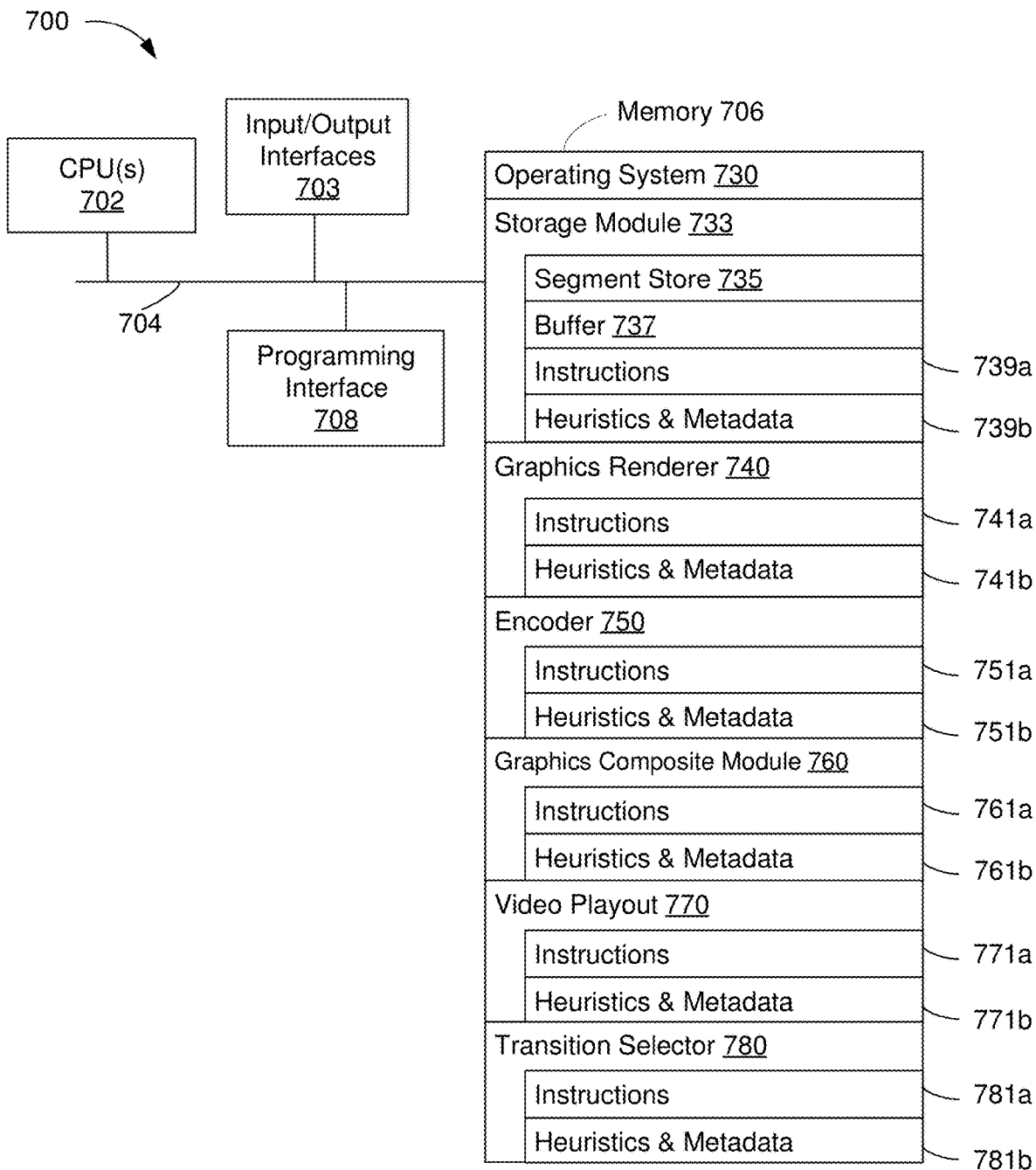
FIG. 7 is a block diagram of a computing device for providing user interfaces (UIs) including transitions among UIs, in accordance with some embodiments.

FIG. 7 is a block diagram of a computing device 700 for transition selection in accordance with some embodiments. In some embodiments, the computing device 700 corresponds to the UI engine 110 in FIGS. 1-4 and performs one or more of the functionalities described above with respect to the UI engine 110. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPUs) 702 (e.g., processors), one or more input/output interfaces 703 (e.g., input devices, sensors, a network interface, a display, etc.), a memory 706, a programming interface 708, and one or more communication buses 704 for interconnecting these and various other components.

In some embodiments, the communication buses 704 include circuitry that interconnects and controls communications between system components. The memory 706 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some embodiments, the memory 706 or the non-transitory computer readable storage medium of the memory 706 stores the following programs, modules and data structures, or a subset thereof including an optional operating system 730, a storage module 733, a graphics renderer 740, an encoder 750, a graphics composite module 760, a video playout 770, and a transition selector 780. In some embodiments, one or more instructions are included in a combination of logic and non-transitory memory. The operating system 730 includes procedures for handling various basic system services and for performing hardware dependent tasks.

In some embodiments, the storage module 733 includes a segment store 735 (e.g., the segment store 50 in FIGS. 3 and 4), e.g., for storing rendered UI objects and tags of the UI objects, and a buffer 737, e.g., for storing a portion of decoded ABR frames and using the stored ABR frames for compositing UI videos. To that end, the storage module 733 includes a set of instructions 739*a* and heuristics and metadata 739*b*.

In some embodiments, the graphics renderer 740 (e.g., the graphics renderer 42 in FIGS. 3 and 4) is configured to render UI artifacts into UI objects. To that end, the graphics renderer 740 includes a set of instructions 741*a* and heuristics and metadata 741*b*.

In some embodiments, the encoder 750 (e.g., the encoder 44 in FIGS. 3 and 4) is configured to encode segments of UI videos. To that end, the encoder 750 includes a set of instructions 751*a* and heuristics and metadata 751*b*.

In some embodiments, the graphics composite module 760 (e.g., the graphics composite module 46 in FIGS. 3 and 4) is configured to composite UI objects with videos. To that end, the graphics composite module 760 includes a set of instructions 761*a* and heuristics and metadata 761*b*.

In some embodiments, the video playout 770 (e.g., the video playout 48 in FIGS. 3 and 4) is configured to play or record UI videos. To that end, the video playout 770 includes a set of instructions 771*a* and heuristics and metadata 771*b*.

In some embodiments, the transition selector 780 (e.g., the transition selector 52 in FIGS. 1 and 3-4) is configured to select transition characteristics based on costs for screen transitions and presenting conditions of client devices. To that end, the transition selector 780 includes a set of instructions 781*a* and heuristics and metadata 781*b*.

Although the storage module 733, the graphics renderer 740, the encoder 750, the graphics composite module 760, the video playout 770, and the transition selector 780 are illustrated as residing on a single computing device 700, it should be understood that in other embodiments, any combination of the storage module 733, the graphics renderer 740, the encoder 750, the graphics composite module 760, the video playout 770, and the transition selector 780 can reside in separate computing devices in various embodiments. For example, in some embodiments, each of the storage module 733, the graphics renderer 740, the encoder 750, the graphics composite module 760, the video playout 770, and the transition selector 780 resides on a separate computing device.

Moreover, FIG. 7 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
receiving, by an edge device, one or more presentation conditions associated with a client device while streaming low latency content to the client device;
transmitting, by the edge device, the one or more presentation conditions to a server;
obtaining, by the edge device, one or more user interface (UI) video segments from the server for transitioning the client device from presenting the low latency content to buffered content and the buffered content, wherein selection of the one or more UI video segments is determined by the server based on costs of the transitioning for the one or more UI video segments determined as a function of costs of UI objects rendered by the server in the one or more UI video segments and the one or more presentation conditions, and the costs of the UI objects are determined by the server based on bits of the UI objects;
allocating, by the edge device, portions of client bandwidth for transmitting the one or more UI video segments and the buffered content to the client device; and
switching, by the edge device, from streaming the low latency content to streaming the one or more UI video segments and the buffered content to the client device according to the allocated portions.

2. The method of claim 1, wherein the one or more presentation conditions include buffer status of a buffer on the client device for storing the one or more UI video segments and the buffered content, and the method further includes:
forwarding, by the edge device, the buffer status to the server; and
obtaining, by the edge device, from the server a switch point to the buffered content, wherein the switch point is determined by the server based at least in part on the buffer status.

3. The method of claim 2, further comprising:
triggering the server to select the one or more UI segments based on the costs of the UI objects, the buffer status, and the switch point.

4. The method of claim 2, wherein allocating, by the edge device, the portions of the client bandwidth for transmitting the one or more UI video segments and the buffered content to the client device includes:
deriving, by the edge device, the client bandwidth from the one or more presentation conditions; and
allocating, by the edge device, a first portion of the portions to the one or more UI video segments and a second portion of the portions to the buffered content based at least in part on the buffer status and a buffer threshold for playing the buffered content at the client device.

5. The method of claim 1, further comprising:
modifying, by the edge device, the one or more presentation conditions prior to transmitting the one or more presentation conditions to the server; and
triggering the server to modify the one or more UI video segments with different costs of transitions.

6. The method of claim 1, further comprising:
receiving and forwarding, by the edge device, changes to the one or more presentation conditions; and
receiving and forwarding, by the edge device, an updated UI video segment, wherein the updated UI video segment is associated with an updated cost of transitions corresponding to the changes to the one or more presentation conditions.

7. The method of claim 1, wherein streaming the one or more UI video segments and the buffered content to the client device includes:
multiplexing, by the edge device, the one or more UI video segments and the buffered content into a stream; and
sending the stream to the client device.

8. The method of claim 1, wherein the one or more presentation conditions include a first screen associated with the low latency content being presented at the client device and a second screen associated with the buffered content being requested by the client device.

9. An edge device comprising:
one or more processors;
a non-transitory memory; and
one or more programs stored in the non-transitory memory, which, when executed, cause the edge device to:
receive one or more presentation conditions associated with a client device while streaming low latency content to the client device;
transmit the one or more presentation conditions to a server;
obtain one or more user interface (UI) video segments from the server for transitioning the client device from presenting the low latency content to buffered content and the buffered content, wherein selection of the one or more UI video segments is determined by the server based on costs of the transitioning for the one or more UI video segments determined as a function of costs of UI objects rendered by the server in the one or more UI video segments and the one or more presentation conditions, and the costs of the UI objects are determined by the server based on bits of the UI objects;
allocate portions of client bandwidth for transmitting the one or more UI video segments and the buffered content to the client device; and
switch from streaming the low latency content to streaming the one or more UI video segments and the buffered content to the client device according to the allocated portions.

10. The edge device of claim 9, wherein the one or more presentation conditions include buffer status of a buffer on the client device for storing the one or more UI video segments and the buffered content, and the one or more programs, which, when executed, further cause the edge device to:
forward the buffer status to the server; and
obtain from the server a switch point to the buffered content, wherein the switch point is determined by the server based at least in part on the buffer status.

11. The edge device of claim 10, wherein the one or more programs, which, when executed, further cause the edge device to:
trigger the server to select the one or more UI segments based on the costs of the UI objects, the buffer status, and the switch point.

12. The edge device of claim 10, wherein allocating, by the edge device, the portions of the client bandwidth for transmitting the one or more UI video segments and the buffered content to the client device includes:
   deriving, by the edge device, the client bandwidth from the one or more presentation conditions; and
   allocating, by the edge device, a first portion of the portions to the one or more UI video segments and a second portion of the portions to the buffered content based at least in part on the buffer status and a buffer threshold for playing the buffered content at the client device.

13. The edge device of claim 9, wherein the one or more programs, which, when executed, further cause the edge device to:
   modify the one or more presentation conditions prior to transmitting the one or more presentation conditions to the server; and
   trigger the server to modify the one or more UI video segments with different costs of transitions.

14. The edge device of claim 9, wherein the one or more programs, which, when executed, further cause the edge device to:
   receive and forward changes to the one or more presentation conditions; and
   receive and forward an updated UI video segment, wherein the updated UI video segment is associated with an updated cost of transitions corresponding to the changes to the one or more presentation conditions.

15. The edge device of claim 9, wherein streaming the one or more UI video segments and the buffered content to the client device includes:
   multiplexing, by the edge device, the one or more UI video segments and the buffered content into a stream; and
   sending the stream to the client device.

16. The edge device of claim 9, wherein the one or more presentation conditions include a first screen associated with the low latency content being presented at the client device and a second screen associated with the buffered content being requested by the client device.

17. A non-transitory memory storing one or more programs, which, when executed by the one or more processors of an edge device, cause the edge device to:
   receive one or more presentation conditions associated with a client device while streaming low latency content to the client device;
   transmit the one or more presentation conditions to a server;
   obtain one or more user interface (UI) video segments from the server for transitioning the client device from presenting the low latency content to buffered content and the buffered content, wherein selection of the one or more UI video segments is determined by the server based on costs of the transitioning for the one or more UI video segments determined as a function of costs of UI objects rendered by the server in the one or more UI video segments and the one or more presentation conditions, and the costs of the UI objects are determined by the server based on bits of the UI objects;
   allocate portions of client bandwidth for transmitting the one or more UI video segments and the buffered content to the client device; and
   switch from streaming the low latency content to streaming the one or more UI video segments and the buffered content to the client device according to the allocated portions.

18. The non-transitory memory of claim 17, wherein the one or more presentation conditions include buffer status of a buffer on the client device for storing the one or more UI video segments and the buffered content, and the one or more programs, which, when executed, further cause the edge device to:
   forward the buffer status to the server; and
   obtain from the server a switch point to the buffered content, wherein the switch point is determined by the server based at least in part on the buffer status.

* * * * *